(12) United States Patent
Caldwell

(10) Patent No.: US 8,220,442 B2
(45) Date of Patent: Jul. 17, 2012

(54) VORTEX EXHAUST RECOVERY SYSTEM HAVING IMPROVED MUFFLER

(75) Inventor: Michael V. Caldwell, Fresno, CA (US)

(73) Assignees: Elvin Haworth, Chowchilla, CA (US); Bob Silva, Fresno, CA (US); Michael V. Caldwell, Clovis, CA (US)

( * ) Notice: Subject to any disclaimer, the term of this patent is extended or adjusted under 35 U.S.C. 154(b) by 61 days.

(21) Appl. No.: 12/950,597

(22) Filed: Nov. 19, 2010

(65) Prior Publication Data

US 2012/0125300 A1    May 24, 2012

(51) Int. Cl.
*F02M 25/07*    (2006.01)

(52) U.S. Cl. .................................... 123/568.12

(58) Field of Classification Search ............. 123/568.12, 123/568.15, 568.17, 568.18; 60/278; 181/204, 181/227, 228
See application file for complete search history.

(56) References Cited

U.S. PATENT DOCUMENTS

| | | | |
|---|---|---|---|
| 3,633,343 A * | 1/1972 | Mark | 96/118 |
| 3,826,067 A * | 7/1974 | Wilder et al. | 55/524 |
| 6,415,888 B2 | 7/2002 | An et al. | |
| 6,588,545 B1 | 7/2003 | Lee | |
| 7,198,036 B2 | 4/2007 | White | |
| 7,331,422 B2 | 2/2008 | Wall | |
| 7,591,866 B2 * | 9/2009 | Bose | 55/337 |
| 7,704,291 B2 * | 4/2010 | Bose | 55/337 |

* cited by examiner

*Primary Examiner* — Hai Huynh
(74) *Attorney, Agent, or Firm* — Richard A. Ryan

(57) ABSTRACT

An exhaust recovery system for use with an internal combustion engine having an air intake device connected to an air/fuel mixing device. The system comprises an improved muffler having a vortex inducing filter mechanism inside the muffler chamber that facilitates separation of engine exhaust air into cool and hot gas streams and encloses a filter element that filters out particulate matter and other pollutants. Engine exhaust air is circumferentially discharged into the muffler chamber and a cone member is disposed inside the chamber to separate and direct the gas streams. The cooled gas stream is redirected to the air intake device through an outlet pipe at the first end of the muffler so pressurized cooled air is directed into the air/fuel mixing device to improve engine performance and efficiency. The filtered hot gas stream is discharged to the environment out a discharge pipe at the second end of the muffler.

20 Claims, 6 Drawing Sheets

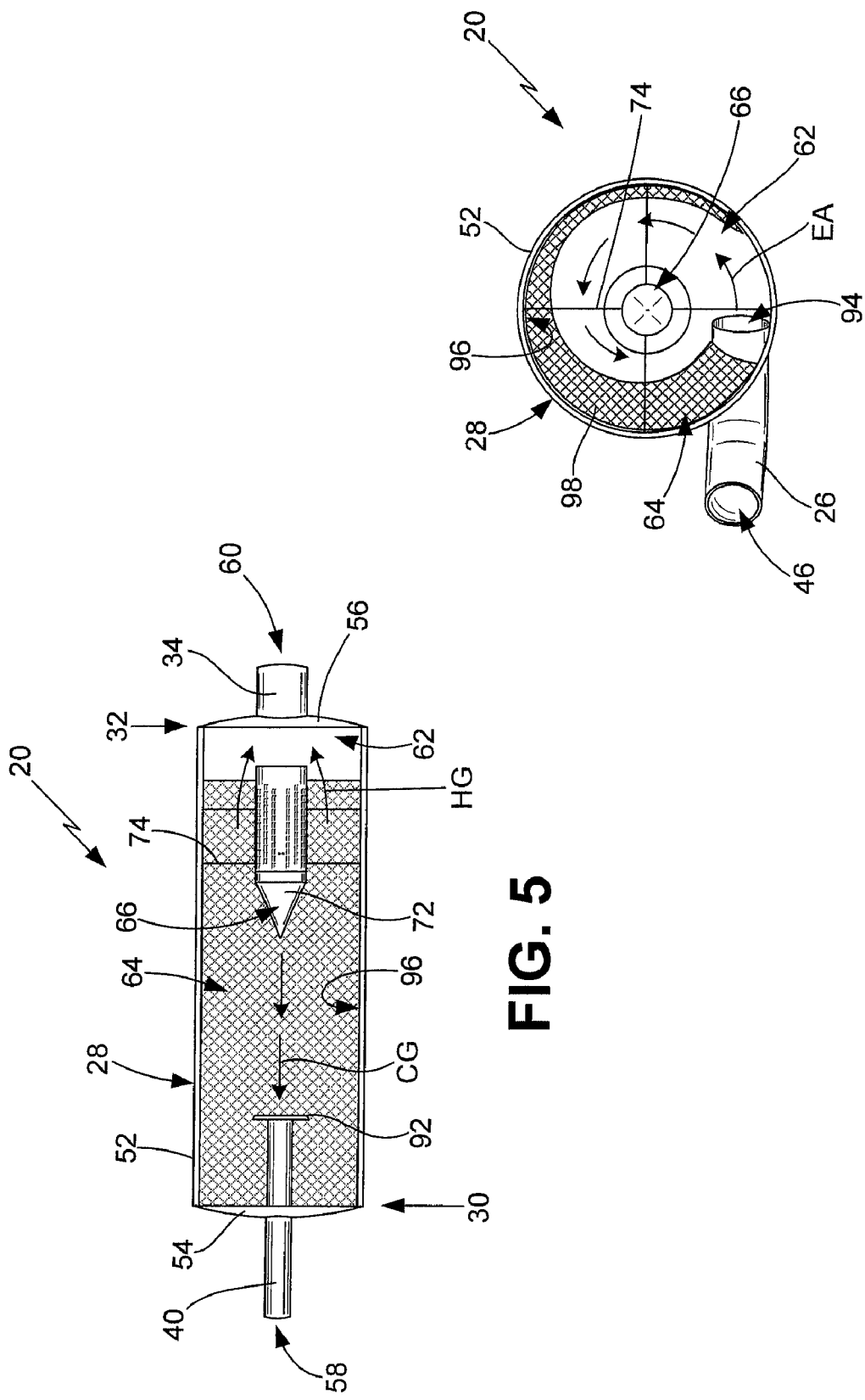

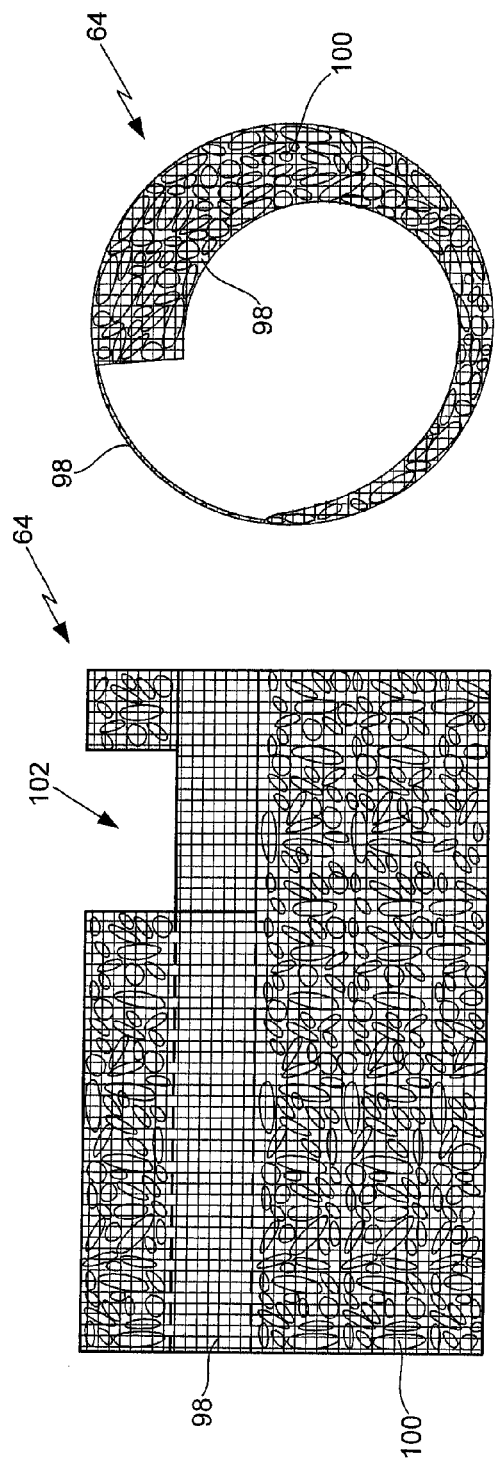
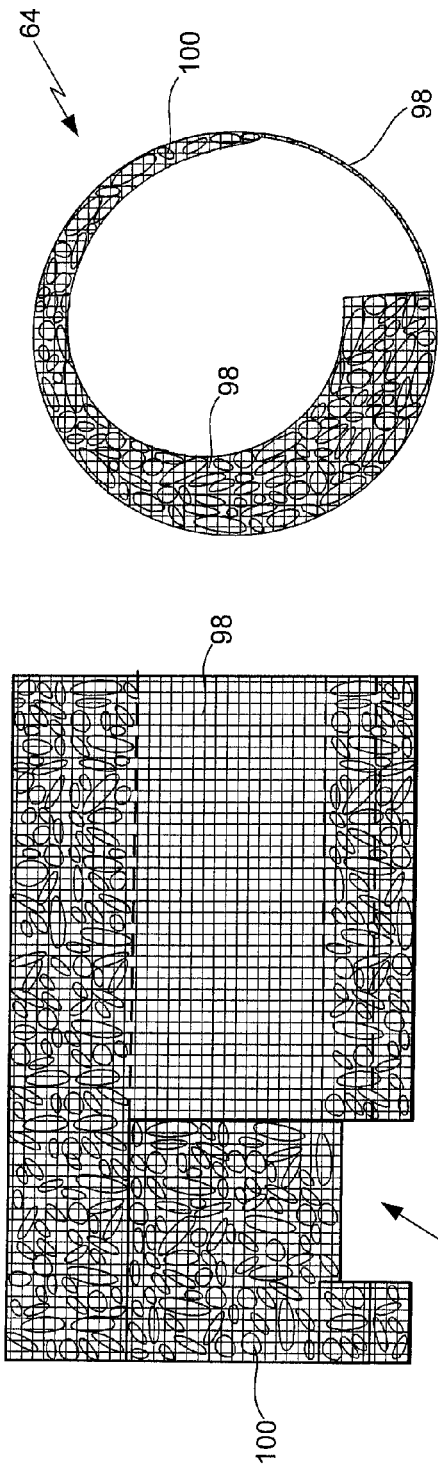
FIG. 9
FIG. 10
FIG. 11
FIG. 12

VORTEX EXHAUST RECOVERY SYSTEM HAVING IMPROVED MUFFLER

CROSS-REFERENCE TO RELATED APPLICATIONS

None.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to exhaust systems utilized with motor vehicles. In particular, the present invention relates to vehicle exhaust recovery systems that cool and then recirculate a portion of the exhaust gases back to the engine to improve engine performance. Even more particularly, the present invention relates to exhaust systems that substantially remove particulate matter from the exhaust discharged by the vehicle to reduce pollution.

B. Background

Internal combustion engines have been and continue to be used in virtually every available mode of transportation and for all types of power supply needs throughout the entire world. Generally, internal combustion engines have a piston that is slidably disposed inside a cylinder with an explosive driving force being utilized to drive the piston in one or both directions in order to rotate an output shaft, such as a crankshaft, connected to the piston. The typical internal combustion engine comprises a plurality of cylinders that each have a piston reciprocating inside to drive a crankshaft in order to produce motion or power. Air and fuel are combined in the combustion chamber, defined inside the cylinder by the cylinder walls and the top of the piston, and then ignited by a spark from a spark plug or other sparking device (gasoline engines) or the heat of compression (diesel engines) to provide the explosive force that drives the piston downward. Air and fuel are fed into the combustion chamber through an air intake device and, after combustion, exhaust gases are forced out through an exhaust valve to a vehicle exhaust system that discharges the exhaust gases to the atmosphere. The typical vehicle exhaust system comprises a muffler configured to reduce the sound of the vehicle exhaust. Many vehicles also utilize, as often required by applicable laws and regulations, a catalytic converter to reduce the pollution associated with the vehicle exhaust.

Although the most common use for an internal combustion engine is to power a motor vehicle, such engines are also commonly utilized to generate electrical power and to power various other machines. For purposes of the present disclosure the term "internal combustion engine" is intended to include all such uses. The terms "motor vehicle" or "vehicle" include all motorized mobile devices that are powered by an internal combustion engine, including but not limited to cars, trucks, vans, motorcycles, scooters and all terrain vehicles (or ATVs). Over the years, the internal combustion engine has been the subject of intensive efforts in the United States and most industrialized countries to improve the operating characteristics of such engines. Despite these efforts, internal combustion engines are well known for relatively inefficient utilization of fuel, such as gasoline, diesel and other products primarily made from oil, and being significant contributors to the air pollution problems that exist in most cities and towns throughout the world.

One common desire for motor vehicle performance is that the vehicle achieve the best available power output (horsepower) and fuel efficiency (such as miles per gallon) for the least amount of fuel use. For instance, despite the availability of lower fuel consumption motor vehicles and vehicles which produce much less pollution, many people are reluctant to give up the size and power that is commonly associated with lower fuel efficiency and/or more polluting vehicles. In some circumstances, many people need higher horsepower output engines to more effectively power their heavy work vehicles, tow another vehicle and/or to drive in the hills or mountains.

Higher oil prices have resulted in higher fuel costs, particularly diesel and gasoline costs, in the United States and generally throughout the world and have highlighted the limited nature of this resource and the risks of a country being dependent on other countries for such an important commodity. Because of the desire to conserve a limited natural resource, reduce dependency on imported oil and spend less money on gasoline or other fuel, most people have a strong desire to improve the fuel efficiency of their motor vehicle. In addition, because of the problems plaguing most industrialized nations with regard to air pollution from motor vehicles, as well as other sources, there is also a strong desire to reduce hydrocarbon emissions from motor vehicles. As a result, there has generally been an increase in technology directed toward improving the fuel efficiency and reducing pollution emissions of motor vehicles while maintaining sufficient power output to achieve the desired use of the motor vehicle.

One known method of improving the performance of a motor vehicle, including fuel efficiency, emissions reduction and horsepower output, is to more throughly mix the air and fuel in the combustion chamber. More complete mixing of the air and fuel is known to provide more complete combustion, which results in more complete use of the vaporized fuel to increase fuel efficiency and power output and lower hydrocarbon emissions from an internal combustion engine. A typical internal combustion engine in a motor vehicle utilizes an air intake device, such as an air filter or air box, that feeds air to an air/fuel mixing device, such as a throttle body injector or carburetor, through an air duct or tube. It is generally well known that improved mixing of the air and fuel in the combustion chamber can be achieved by swirling the air flow prior to the addition of fuel in the air/fuel mixing device and by utilizing cooler intake air. Most air swirling devices, such as turbo charges and blowers, are installed upstream of the engine air intake device and are somewhat expensive and complicated devices that typically require ongoing maintenance. Other commercially available air swirling devices are configured to be installed inside an air intake device. Generally, however, these air swirling devices are sized and configured to be utilized with a specific carburetor or fuel injection system or to fit within a specific air intake device.

One type of system that has been developed to minimize the amount of pollutants, including nitrogen oxide (NOX) and like gases, that are discharged from internal combustion engines is an exhaust gas recirculation system. The typical exhaust gas recirculation system redirects a portion of the exhaust gas from the engine back into the air intake device where the exhaust gas is utilized as part of the engine's air intake supply. This recycling of the exhaust gas back into the combustion cycle lowers the air temperature thereof, which slows the combustion process and reduces the formation of nitrous oxides. In addition, the recycling of the exhaust gas allows the engine to burn any previously unburned hydrocarbons which would have been discharged to the atmosphere, thereby reducing pollution from the engine.

Cooling the exhaust gas prior to its recirculation into the air intake device is known to improve engine performance and reduce pollution associated with the vehicle emissions. Various cooling mechanisms, including air-to-air coolers, water coolers and other heat transfer devices, have been utilized to cool the exhaust gases being recycled to the engine by an exhaust gas recirculation system. In general, these systems have not been commercially successful due to the need for increased heat handling capability by the engine, such as larger radiators and the like. It is also known to use a vortex tube, also commonly referred to as a Ranque-Hilsch vortex tube, to separate a single exhaust gas stream into hot and cold (or at least cool) streams through differences in density. As known in the art, pressurized gas is received into a chamber defined by the tube that is configured to swirl the gas in a manner that directs the hotter air to the outer portion of the chamber and the cooler air to the inner portion of the chamber.

Over the years, various exhaust systems and devices have been patented to improve the performance of an internal combustion engine. For instance, U.S. Pat. No. 7,198,036 to White describes the use of a vortex tube connected to the engine air intake and an air tank to provide compressed air to an air valve at the input of the vortex tube. The compressed air is injected circumferentially into the vortex tube at sonic speed to create a cyclonic spinning effect within the tube to separate the air flow into cold and hot flows. U.S. Pat. No. 7,331,422 to Wall describes a vortex muffler having a stationary fan disposed in the inner passage of the muffler that creates a vortex in the inner passage to improve air flow through the muffler and reduce the exhaust sound level. U.S. Pat. No. 6,588,545 to Lee describes a muffler for internal combustion engines that comprises a vortex diffusing member mounted in the muffler casing which is connected to the exhaust inlet pipe to reduce exhaust sound and improve engine performance by allowing the exhaust gas to better flow through the muffler. U.S. Pat. No. 6,415,888 to An, et al. describes a muffler having a helicoil member in each conduit through which refrigerant gas flows that is configured to create a vortex flow for the refrigerant gas to reduce noise associated with a refrigerant gas compressor and improve the efficient operation thereof.

While the foregoing patents and other prior art disclose devices and systems that generally provide, or at least are intended to provide, more complete utilization of the exhaust gas from an internal combustion engine so as to improve performance of the engine and reduce pollution associated therewith, they have certain limitations that have generally limited their commercial acceptance. What is needed, therefore, is an improved system that effectively recirculates exhaust gas from an internal combustion engine to improve the performance of the engine and reduce pollution therefrom. The preferred exhaust gas recirculation system should be configured to be utilized with a wide variety of different types of internal combustion engines and, in particular, be installed on motor vehicles that utilize such engines. Preferably, such an improved system should direct cooled exhaust gas into the air intake device of an internal combustion engine to achieve more complete combustion of the engine fuel and discharge cleaner exhaust gas to the atmosphere to reduce pollution from the engine. The preferred exhaust gas recirculation system should include an improved muffler that can be installed in the engine exhaust system to redirect cooled exhaust gas to the air intake device and discharge cleaner exhaust gas to the atmosphere.

SUMMARY OF THE INVENTION

The exhaust recovery system of the present invention provides the benefits and solves the problems identified above. That is to say, the present invention discloses a vortex exhaust recovery system for use with an internal combustion engine that improves fuel efficiency and power output performance of the engine and reduces the pollution emissions associated with the engine. The vortex exhaust recovery system of the present invention comprises an improved muffler that is installed in the engine's exhaust system to redirect cooled exhaust gas to the engine's air intake device so as to more completely combust the fuel in the combustion chamber of the engine, thereby resulting in higher horsepower output, increased fuel efficiency and less hydrocarbons in the exhaust gas. The improved muffler substantially reduces particulate matter and pollution emissions from the internal combustion engine. The muffler utilized with the vortex exhaust recovery system of the present invention creates a vortex inside the muffler chamber that directs cooled air to the inner portion of the chamber where it is redirected to the engine's air intake device and directs the hot air to a filter positioned at the outer portion of the chamber that cleans the exhaust gas prior to being discharged to the atmosphere. In use with motor vehicles, the improved muffler of the present system replaces the vehicle's existing muffler, requiring little or no modification to the vehicle or its air intake and exhaust systems.

In a primary embodiment of the present invention, the vortex exhaust recovery system generally comprises a muffler pneumatically connected to the discharge end of an exhaust pipe of an internal combustion engine and a return conduit pneumatically interconnecting a first end of the muffler with the air intake device of an internal combustion engine. The muffler has a housing comprising a sidewall, a first end cap at a first end of the muffler and a second end cap at a second end of the muffler. The muffler housing defines a chamber within the muffler. An air inlet pipe generally at or near the first end of the muffler has a first end that connects to the engine exhaust pipe, typically via a catalytic converter or like device, and a second end that is disposed inside the muffler chamber. The first end of the air inlet pipe receives exhaust air from the internal combustion engine and the second end of the air inlet pipe circumferentially discharges the exhaust air into the muffler chamber. The muffler has an outlet pipe at the first end cap that has a pipe body with a first end extending outside of the muffler to define a return outlet and a second end extending into the muffler chamber to define a tube inlet. The return conduit pneumatically connects the return outlet of the outlet pipe with the air intake device. The muffler has a discharge pipe at the second end cap that pneumatically connects the muffler chamber to the environment. A cone member is disposed inside the chamber with its cone tip directed toward the tube inlet of the outlet pipe. The muffler also has a vortex inducing filter mechanism disposed inside the muffler chamber along an inner wall of the housing and generally around the cone member. The vortex inducing filter mechanism is shaped so as to facilitate swirling of the exhaust air in the chamber and the cone member is positioned inside the chamber to separate the exhaust air into a cooled gas stream and a hot gas stream. The vortex inducing mechanism encloses a filter element that comprises filtering material which is selected to remove particulate matter and/or pollutants from the exhaust air and the hot gas stream.

In operation, the cooled gas stream is directed toward the tube inlet of the outlet pipe, out the return outlet and through the return conduit to the air intake device where it is directed to the air/fuel mixing device to improve the performance and efficiency of the internal combustion engine. The hot gas stream is directed around the cone body and out the discharge pipe to the environment as hot exhaust air that is much less polluting than the exhaust air from the engine. As such, the system and muffler of the present invention will improve fuel efficiency and power output performance of the internal combustion engine and reduce the pollution emissions associated with the engine.

In one embodiment, the outlet pipe is moveably disposed relative to the first end cap to allow the user to selectively vary the distance between the tube inlet and the cone tip to change the performance characteristics of the muffler. The vortex inducing filter mechanism can comprise a porous screen that encloses the filter element in the chamber and allows air flow through the filter element. The filter element can be removably disposed inside the screen to allow removal for cleaning or replacement. Alternatively, the entire vortex inducing filter mechanism can be removably disposed inside the muffler chamber so that it can be removed for cleaning or replacement. In a preferred embodiment, the exhaust recovery system has an exhaust heating mechanism that is associated with at least one of the air inlet pipe and the muffler to heat the exhaust air. In one embodiment, the exhaust heating mechanism is positioned near the first end of the air inlet pipe to heat the exhaust air prior to entering the muffler chamber. Alternatively, the exhaust heating mechanism can be disposed along the sidewall of the muffler. The exhaust heating mechanism can comprise one or more heating elements, such as glowplugs or the like, that have a heating filament disposed inside the air inlet pipe and/or the muffler chamber. A controller can be utilized to selectively control the operation of the exhaust heating mechanism to prevent overheating of the exhaust heating mechanism or the electrical systems associated with the engine. In another embodiment, the system also includes an air valve mechanism which is pneumatically connected to the return conduit, typically positioned toward the air intake device, and to a secondary air conduit that is pneumatically connected to a source of secondary air, such as ambient air or a cold air storage device. The air valve mechanism is configured to measure the temperature of the return air and selectively direct either the cooled return air to the air intake device or direct air from the source of secondary air to the air intake device if the return air is too hot.

Accordingly, the primary aspect of the present invention is to provide a vortex exhaust recovery system that has the advantages discussed above and which overcomes the disadvantages and limitations associated with prior art exhaust recovery systems.

It is an important aspect of the present invention to provide a vortex exhaust recovery system for use with an internal combustion engine that directs cooled exhaust gas to the engine's air intake device to increase the performance of the engine, namely to increase the engine's horsepower output and fuel efficiency and reduce its hydrocarbon emissions, and directs hot exhaust gas through a filter that cleans the exhaust gas prior to discharging it to the atmosphere.

It is also an important aspect of the present invention to provide an improved exhaust recover system for use with internal combustion engines that comprises a muffler installed in the engine's exhaust system that is configured to produce a vortex inside the muffler chamber which directs cooled exhaust gases to the engine's air intake device and directs hot exhaust gases through a filter inside the muffler chamber to clean the exhaust gas prior to discharge of the exhaust gas to the atmosphere.

It is also an important aspect of the present invention to provide an improved exhaust recovery system for use with internal combustion engines that is adaptable to a wide variety of different internal combustion engines.

Another important aspect of the present invention is to provide a vortex exhaust recovery system that comprises a muffler which replaces a motor vehicle's existing muffler and connects to the engine's air intake device.

Yet another important aspect of the present invention is to provide a vortex exhaust recovery system having a muffler with a removable cartridge that comprises one or more exhaust gas purifying materials selected to remove particulate matter and other pollutants from the exhaust of an internal combustion engine.

The above and other aspects and advantages of the present invention are explained in greater detail by reference to the attached figures and the description of the preferred embodiment which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention:

FIG. 5 is a cross-sectional side view of the muffler of FIG. 2 taken through lines 5-5 of FIG. 3;

FIG. 6 is the same end view of the first or forward end of the muffler shown in FIG. 3 with the first end cap removed to show the vortex inducing filter mechanism disposed inside the muffler housing;

FIG. 9 is a side view of the vortex inducing filter mechanism utilized with the muffler of FIG. 2;

FIG. 10 is a top view of the vortex inducing filter mechanism of FIG. 9;

FIG. 11 is an end view of the first end of the vortex inducing filter mechanism of FIG. 9;

FIG. 12 is an end view of the second end of the vortex inducing filter mechanism of FIG. 9.

DETAILED DESCRIPTION OF THE PREFERRED EMBODIMENTS

Figure 1:
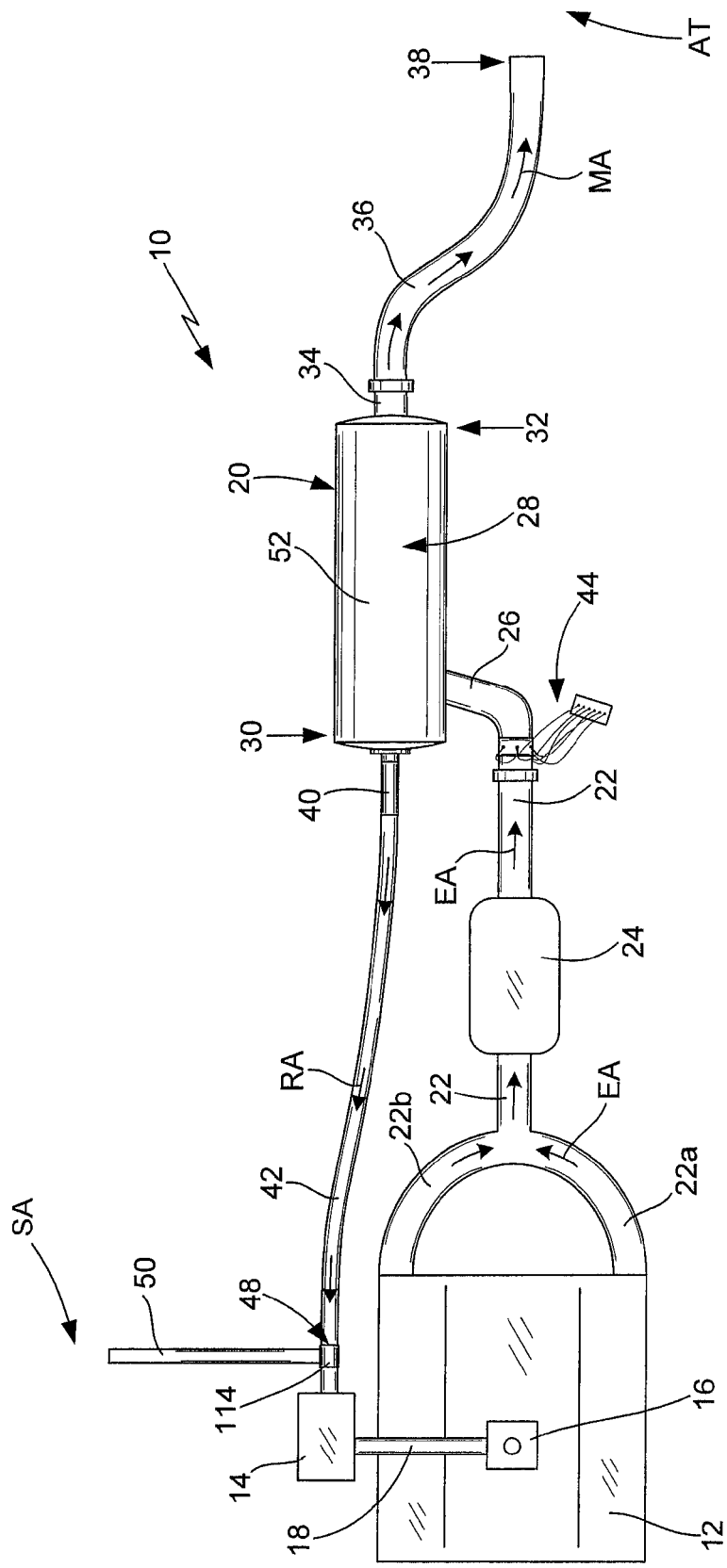
FIG. 1 is a schematic top view representation of a vortex exhaust recovery system configured according to a preferred embodiment of the present invention shown in use with an internal combustion engine.
Figure 3:
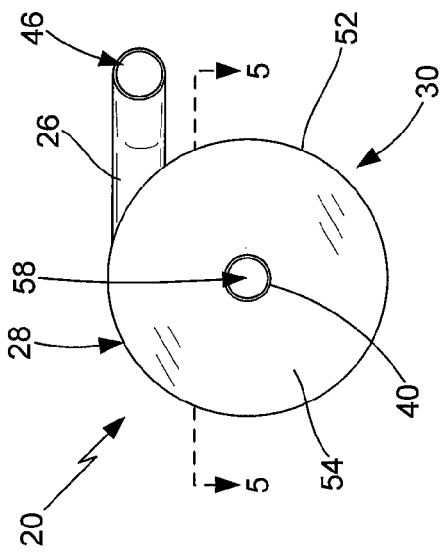
FIG. 3 is an end view of the first or forward end of the muffler of FIG. 2 shown without the exhaust heating mechanism.
Figure 4:
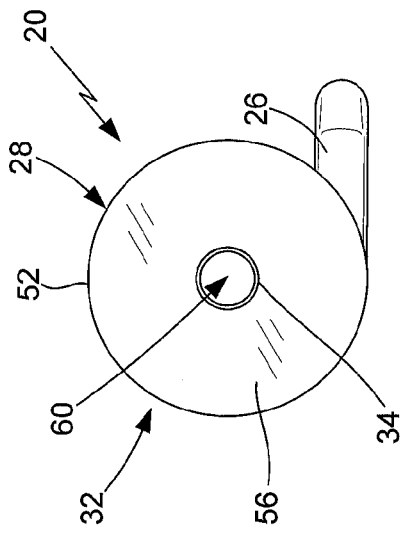
FIG. 4 is an end view of the second or rearward end of the muffler of FIG. 2 shown without the exhaust heating mechanism.

With reference to the figures where like elements have been given like numerical designations to facilitate the reader's understanding of the present invention, the preferred embodiments of the present invention are set forth below. The enclosed text and drawings are merely illustrative of one or more preferred embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein show and describe certain shapes and configurations for the various components of the vortex exhaust recovery system of the present invention, those skilled in the art will understand that this is merely for purposes of simplifying this disclosure and that the present invention is not so limited.

A vortex exhaust recovery system that is configured pursuant to a preferred embodiment of the present invention is shown generally as 10 in the figures. As set forth in more detail below, the vortex exhaust recovery system 10 is utilized with an internal combustion engine 12 having air intake device 14 that directs air into the air/fuel mixing device 16 of the internal combustion engine 12 through air hose 18 so the air may be utilized for combustion in the engine 12 to produce the explosive force which drives the operation of the engine 12. In a typical configuration for engine 12, the air intake device 14 receives ambient air and directs it into the air fuel mixing device 16, where fuel is mixed with the air. After mixing, the air/fuel mixture is forced into the engine's combustion chamber where the mixture is ignited to create an explosive force that provides the desired engine operation (i.e., drive the piston to rotate a crankshaft). In the typical prior art operation, air flows from the air intake device 14 through air hose 18, which is a hollow air conduit comprising a generally rigid or flexible rubber or plastic tube, to the air/fuel mixing device 16. The air intake device 14 of a typical internal combustion engine 12 will either be an air filter or an air box apparatus and the air/fuel mixing device will either be a carburetor or a throttle body injector. As stated above, the air/fuel mixture is forced under pressure into the combustion chamber, typically defined by the walls and top of the cylinder and the top of the piston reciprocating inside the cylinder, of engine 12 where a sparking device (i.e., a spark plug) or the heat of compression ignites the air/fuel mixture to create an explosive force that pushes the piston and rotates a crankshaft or other output shaft attached to the piston to create the desired work, such as rotating the wheels of a motor vehicle or driving a generator to produce electricity.

Figure 2:
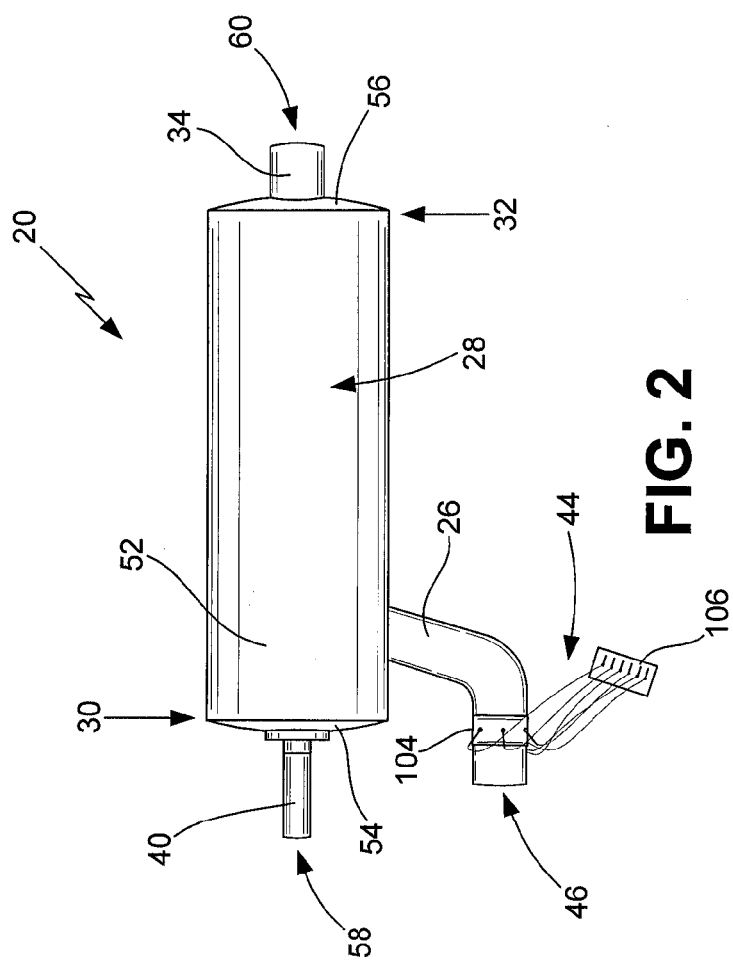
FIG. 2 is a side view of the muffler utilized with the vortex exhaust recovery system of FIG. 1.

As shown in FIG. 1, the vortex exhaust recovery system 10 of the present invention comprises an improved muffler 20 that receives exhaust air, shown as EA, from internal combustion engine 12 that is discharged therefrom through one or more exhaust pipes, such as a pair of exhaust pipes 22a and 22b, returns cooled air, shown as RA, to the air intake device 14 and discharges hot exhaust air, shown as MA, out to the atmosphere AT. The improved muffler 20 of the present invention is configured to replace a standard, prior art muffler. In one typical motor vehicle configuration, the two exhaust pipes 22a and 22b join in a single exhaust pipe 22 that directs the exhaust air rearward through an exhaust air treating device, such as a catalytic convertor 24 or the like, to muffler 20 (or in the prior art to a prior art muffler). The rearward end of exhaust pipe 22 connects to muffler 20 at an air inlet pipe 26 that extends outward and generally forward from sidewall 28 of muffler 20 at or near the first or forward end 30 of muffler 20, as shown in FIGS. 1 and 2. At a rearward end 32 of muffler 20, a discharge pipe 34 connects to the tailpipe 36 to discharge the exhaust air MA to the atmosphere AT through the open distal end 38 of tailpipe 36. Cooled return air RA is discharged out of muffler 20 through an outlet pipe 40 at the forward end 30 of muffler 20 into a hose, tube or other elongated tubular return conduit 42 that connects to the air intake device 14. As shown in FIGS. 1 and 2, a preferred embodiment of system 10 also includes an exhaust heating mechanism 44 at the first/forward end 46 of the air inlet pipe 26 and an air valve mechanism 48, shown connected to a secondary air conduit 50, in the return conduit 42, typically at or near air intake device 14. The purpose, function and interaction of the various components of the system 10 set forth above are described in more detail below.

The terms "forward" and "rearward" utilized in the present disclosure refer to the relative locations on a motor vehicle with engine 12 located at or near the forward end of the vehicle and hot exhaust air MA from the muffler 20 being discharged generally at or near the rearward end of the vehicle. As will be readily appreciated by those skilled in the art, for many non-motor vehicle uses and with regard to certain motor vehicles it may be that the engine 12 may not be located "forward" of the muffler 20 and the hot exhaust air MA may not be discharged in a direction which is considered "rearward". The system 10 and muffler 20 of the present invention will be equally applicable to all such uses. For instance, the system 10 and muffler 20 are applicable to trucks, busses and like vehicles that discharge the hot exhaust air MA upward instead of rearward.

The muffler 20 for use with the system 10 and internal combustion engine 12 comprises a housing 52 having sidewall 28 with a first end cap or plate 54 at the first end 30 thereof and a second end cap or plate 56 at the second end 32 thereof, as best shown in FIGS. 1 and 2. Typically, the housing 52 will have a circular or generally elliptical cross-section. Except for the outlet pipe 40, which has a return outlet 58 at the forward end thereof, the first end cap 54 sealably closes the first end 30 of muffler 20. Likewise, except for the discharge pipe 34, having a discharge outlet 60 at the rearward or distal end thereof, the second end cap 56 sealably closes the second end 32 of muffler 20. The first 54 and second 56 end caps prevent pressurized exhaust air EA from escaping out of muffler 20 except through the return outlet 58 and discharge outlet 60, respectively. In a preferred embodiment, at least one of the first end cap 58 and the second end cap 60 are removably attached to their respective ends 30/32 of muffler 20 so the user, or someone on his or her behalf, may have access to the interior of muffler 20 as needed or desired. In a motor vehicle application, the muffler 20 would typically (but not always) be mounted to or otherwise placed along the underside of the motor vehicle. As such, the housing 52, first end cap 54 and second end cap 56 should be made out metal, ceramic, carbon fiber or other materials that have suitable strength, heat and corrosion resistant properties for use in vortex exhaust recovery system 10.

The housing 52, first end cap 54 and second end cap 56 collectively define a muffler chamber 62 inside muffler 20 that, as set in more detail below, is configured with a vortex inducing filter mechanism 64 which allows the muffler 20 to function as a vortex tube (also known as a Ranque-Hilsch tube) to produce a vortex that separates the pressurized exhaust air EA discharged from engine 12 into separate streams of hot gas, shown as HG, and cooled gas, shown as CG, and which filters the exhaust gas EA to remove particulate matter and other pollutants prior to being discharged from the muffler 20, through discharge outlet 60, as the hot exhaust air MA, as best shown in FIGS. 5 and 6. Disposed inside muffler chamber 62 and substantially surrounded by the vortex inducing filter mechanism 64 is the rearward section of outlet pipe 40 and a cone member 66, which functions as the nozzle in the Ranque-Hilsch vortex tube. As known in the art, the cone member 66 is positioned inside chamber 62 so as to allow the hot gas stream HG to pass around it to the discharge pipe 34 and out discharge outlet 60 and to produce the inner stream that returns the cooled gas stream CG to the return conduit 40, where it exits at return outlet 58 into return conduit 42 and is delivered to air intake device 14, as return air RA, and then to the air/fuel mixing device 16, as shown in FIGS. 1 and 5.

Figure 7:
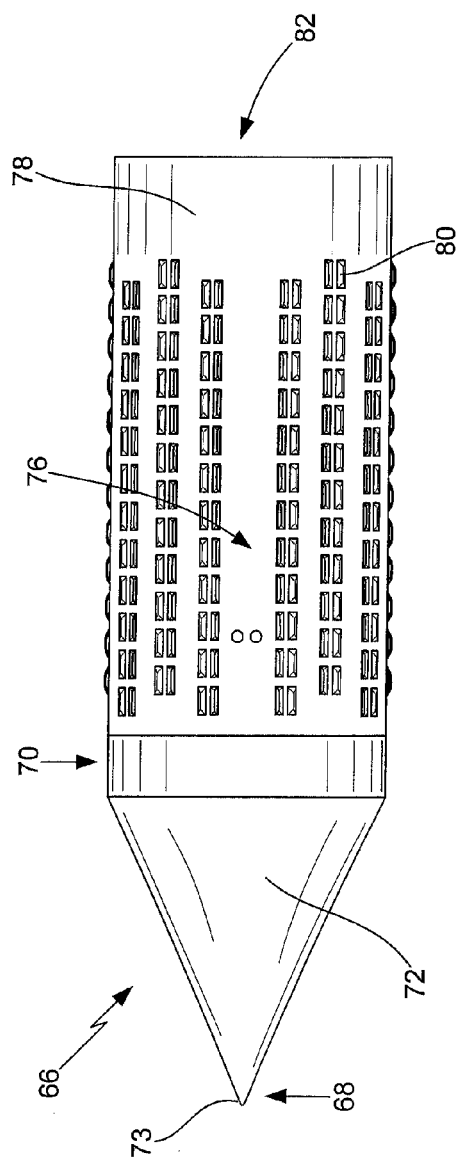
FIG. 7 is a side view of the cone member utilized in the muffler of FIG. 2 shown in use with a cone extension having baffling elements thereon.

As best shown in FIG. 7, cone member 66 has a first or forward end 68 directed toward outlet pipe 40 at the first end 30 of muffler 20 and a second or rearward end 70 positioned toward discharge pipe 34 at the second end 32 of muffler 20. In the preferred embodiment, the cone member 66 comprises a solid, conically shaped cone body 72 that is held in position at or near the center of the muffler chamber 62, as best shown in FIGS. 5 and 6. The cone body has a cone tip 73 at the first end 68 thereof. Cone body 72 is positioned in chamber 62 with the cone tip 73 directed toward the outlet pipe 40 at the first end 30 of the muffler 20, as shown in FIG. 5. The cone body 72 can be made out of steel, aluminum, brass or other metals and/or a variety of non-metals. In one embodiment, a plurality of relatively small diameter support rods 74 are utilized to at least substantially center the cone member 66 inside chamber 62. In the embodiment shown in the figures, the cone member 66 also includes a cone extension 76 that is attached to and extends rearward from the second end 70 of cone member 66, as shown in FIGS. 5 and 7. In this embodiment, cone extension 76 comprises a tubular shaped extension body 78 having a plurality of baffle elements 80 thereon that are open to the interior of extension body 78 to allow some of the hot exhaust air MA to pass therethrough and out its open distal end 82 toward the discharge pipe 34 (the majority of the exhaust air MA will pass around the cone member 66). Although cone extension 76 is not required to achieve the vortex function of muffler 20 in the system 10 of the present invention, the use thereof will reduce the noise of the exhaust gas EA as it passes through the muffler 20.

Figure 8:
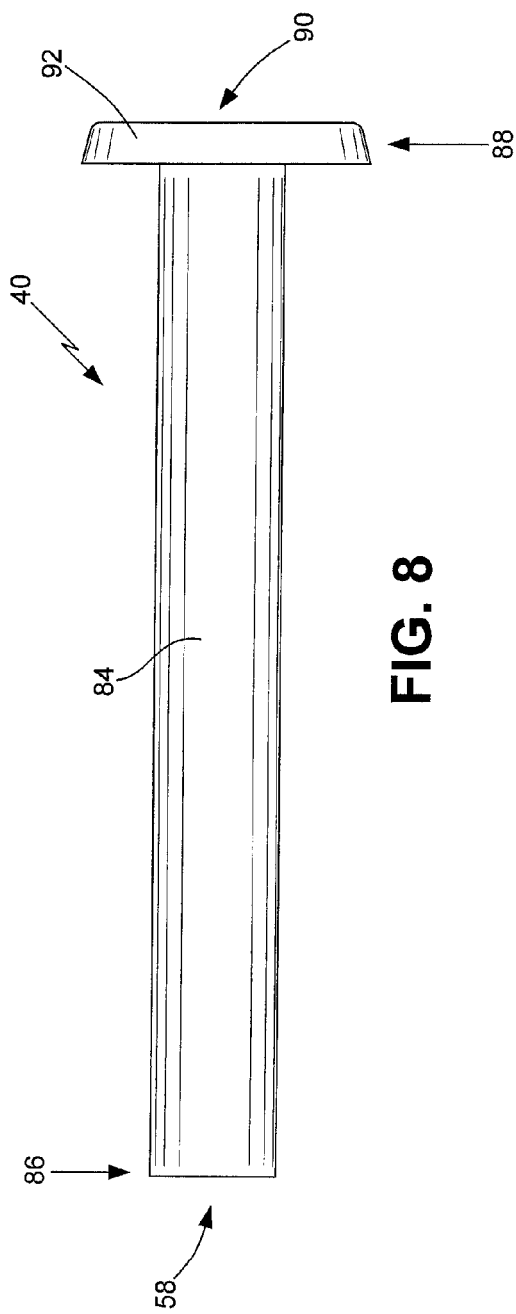
FIG. 8 is a side view of the cool air discharge pipe utilized with the muffler of FIG. 2.

The outlet pipe 40, best shown in FIG. 8, has a tubular pipe body 84 with a first end 86 that defines the return outlet 58 through which the return air RA is delivered to the air intake device 14 and a second end 88 that has an open tube inlet 90 to receive the cooled gas stream CG that results from the vortex effect of the vortex inducing filter mechanism 64. The cone member 66 is positioned in the chamber 62 such that the cone tip 73 is directed toward the tube inlet 90, as shown in FIG. 5. In a preferred embodiment, but not necessarily required, the outlet pipe comprises a flared member 92 at the second end 88 of the tubular body 84 to assist with directing the cooled gas stream CG into tubular body 84 so that it may flow therethrough to become the return air RA that is ultimately utilized by the air/fuel mixing device 16 to produce the air/fuel mixture necessary for combustion in engine 12. The outlet pipe 40 can be made out of metal, ceramic, carbon fiber or a variety of other materials. Preferably, the depth insertion (position) of the second end 88 of the tubular pipe body 84 of outlet pipe 40 inside the muffler housing 52 is adjustable so the user can adjust the distance between the tube inlet 90 and the tip 73 of the cone body 72 to make them further apart or closer together, which will change the operating characteristics of the muffler 20.

The vortex inducing filter mechanism 64, shown in FIGS. 5 through 9, is configured to swirl the exhaust air EA coming into the muffler chamber 62 from air inlet pipe 26, through the open second/rearward end 94 (shown in FIG. 6), to achieve the desired separation of the exhaust air EA into the cooled gas stream CS and hot gas stream HG. Vortex inducing filter mechanism 64 is also configured to filter the exhaust air EA to remove the particulate matter and/or other pollution that is known to exist in the exhaust air EA from the engine 12. As best shown in FIGS. 6, 9 and 10, the vortex inducing filter mechanism 64 is placed against the inner wall 96 of the muffler housing 52 and it has a generally helicoidial or spiral shape cross-section that facilitates the cyclone or swirling motion necessary to achieve the desired vortex effect of a vortex tube. The exhaust air EA is directed circumferentially into the muffler 20 by the placement of the second end 94 of air inlet pipe 26 at the sidewall 28 of muffler 20, as shown in FIG. 6, so that the exhaust air EA will spin inside chamber 62 and separate into the cooled gas stream CG and hot gas stream HG. The cooled gas stream CG will separate towards the center of the chamber 62 and then be directed back towards the outlet pipe 40 at the first end 30 of the muffler 20. The hot gas stream HG will separate towards the outer portion of chamber 62 and then be directed around the cone member 66 and out the discharge pipe 34. Initially, the exhaust air EA discharged out the second end 94 of air inlet pipe 40 will pass through and be filtered by the vortex inducing filter mechanism 44, with the separated hot gas stream HG continuing to pass through vortex inducing filter mechanism 44 as it moves rearward towards the discharge pipe 34.

As stated above, the exhaust air EA and hot gas stream HG pass through the vortex inducing filter mechanism 44 so it may filter particulate matter and/or other pollutants. To achieve this, the vortex inducing filter mechanism 44 has a screen or other porous outer layer 98 through which the gases flow and which encloses a filter element 100. The screen 98 should be selected so as to allow gas to easily pass through to the filer element 100 and to retain the filter element 100 in position along the inner wall 96 of the muffler housing 52, as shown in FIGS. 5 and 6. If desired, the outer wall of the vortex inducing filter mechanism 64, which is disposed against the inner wall 96 of muffler housing 52 when in use inside muffler 20, can be solid or substantially solid. In a preferred embodiment, the vortex inducing filter mechanism 44 is removably disposed inside the muffler housing 52. The filtering materials of filter element 100 should be selected so as to remove, at least to a partial or (preferably) substantial extent, the target particulate and/or other pollutants. As well known in the art, various filtering materials can be utilized for the filter element 100. In one embodiment, filter element 100 comprises particles of peridotite, typically provided in a rock or rock-like condition or in granular or crushed condition. Peridotite, is a dense coarse-grained igneous rock that is found in the Earth's mantle. Relatively recent research indicates that peridotite can be beneficially utilized to remove pollutants from a gas, such as exhaust air EA. In another embodiment, filter element 100 can comprise a plurality of zeolite and/or zeolite-based materials, some of which are generally well known for being able to remove the type of pollutants that are found in the gases that make up the exhaust air EA from an internal combustion engine 12. If desired, the filter element 100 can comprise a plurality of relatively small particles of the zeolite and like pollution-absorbing materials. Alternatively to or in addition to zeolite and like materials, the filter element 100 can comprise particles of charcoal and/or catalytic substances (such as vanadium and the like). Charcoal is well known for its absorbent properties and catalytic substances are commonly utilized in automotive exhaust systems. As well known in the art, the materials for filter element 100 should be sufficiently porous to allow gas to pass through the filter element 100 and contact the filtering substances so that it may interact with the gas and absorb or otherwise remove the particulate matter and/or other pollutants.

In a preferred embodiment of the muffler 20, at least filter element 100 of the vortex inducing filter mechanism 64 is removably disposed inside the muffler housing 52 so that it may be removed for cleaning and/or replacement. Preferably, the entire vortex inducing filter mechanism is removably disposed inside muffler housing 52 for cleaning and/or replacement. In one embodiment, the second end cap 56 is removably attached to the housing 52 and the entire vortex inducing filter mechanism 64 is able to be removed from the housing 52 through the second end 32 of muffler 20. Alternatively, the first end cap 54 can be removably attached to housing 52 so the vortex inducing filter mechanism 64, or just the filter element 100, can be removed through the first end 30 of muffler 20. To facilitate removal and reinstallation of the vortex inducing filter mechanism 64, it can be provided with a mechanism that allows the user to twist and lock the vortex inducing fitter mechanism 64 inside the housing 52. FIGS. 9 and 10 show the use of a notched section 102 that is sized and configured to lock into position around the second end 94 of the air inlet pipe 26. In this embodiment, the user inserts the vortex inducing filter mechanism 64 into the muffler body 52 through the open second end 32 of the muffler 20 and then twists it until notched section 102 is positioned around second end 94 of air inlet pipe 26, as shown in FIG. 6. Various other locking or engaging mechanisms can be utilized to removably secure the vortex inducing filter mechanism 64 into the muffler body 52.

Figure 13:
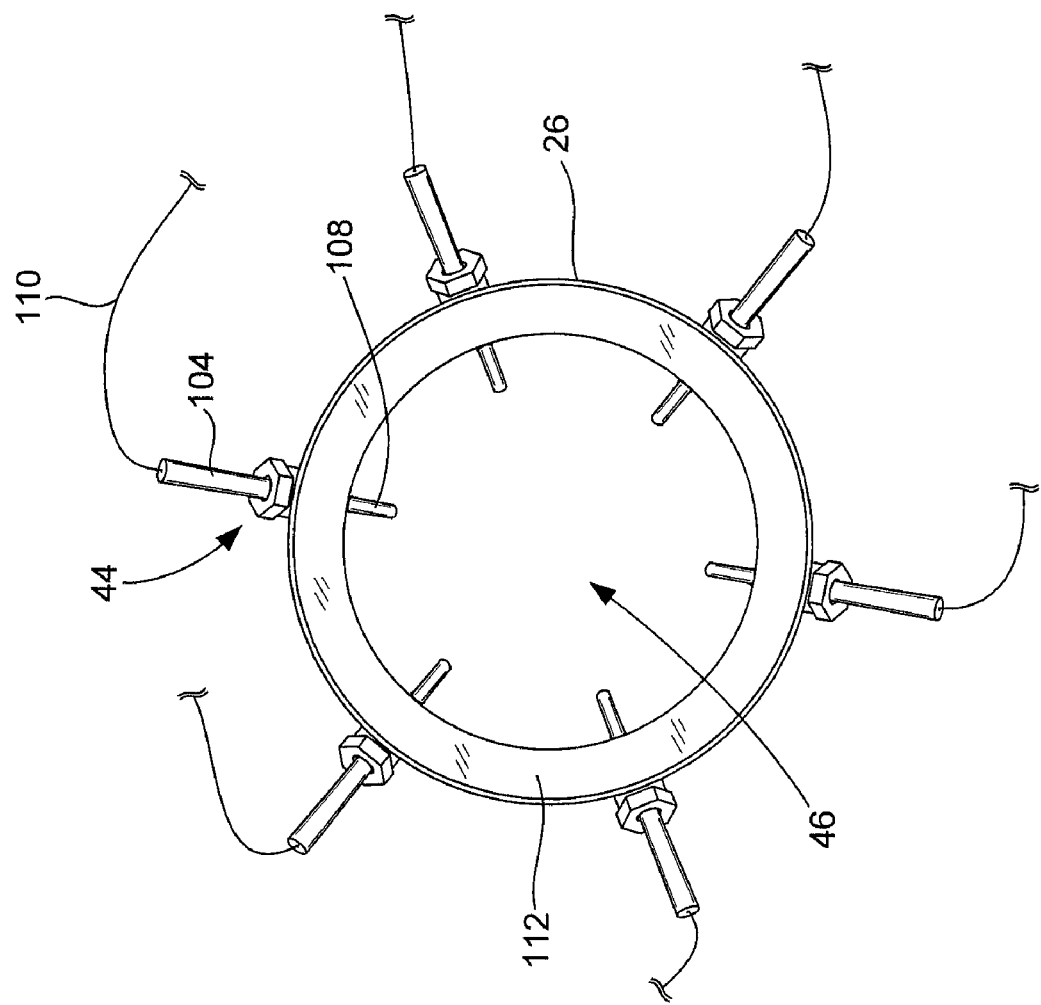
FIG. 13 is an end view of the exhaust air inlet pipe of the muffler of FIG. 2 shown with the exhaust heating mechanism having a portion of the heating elements disposed inside the air inlet pipe.

The exhaust air EA from engine 12 can flow into muffler 20 from the catalytic converter 24 without any additional treatment. Preferably, however, the exhaust air EA is heated utilizing exhaust heating mechanism 44 to incinerate some of the particulate matter and/or other pollutants prior to entering the muffler 20. In addition, heating up the exhaust air EA prior to the muffler 20 will make the gases lighter, which should improve the performance of the vortex system inside muffler 20 and, ultimately, the engine 12. In one embodiment, the exhaust heating mechanism 44 comprises one or more heating elements 104, typically a plurality will be utilized, that are at least partially disposed inside air inlet pipe 26 to heat the exhaust air EA as it passes through to the muffler 20 and which are connected to and operatively controlled by an electronic or other controller 106, as shown in FIGS. 1, 2 and 13. In the embodiment shown in the figures, exhaust heating mechanism 44 is positioned near the first end 46 of air inlet pipe 26. The heating elements 104 should be selected so as to be appropriate for heating a flowing gas stream. A variety of heating elements 104 can be utilized for the exhaust heating mechanism 44. In a one preferred embodiment, the heating elements 104 are glowplugs that have a heating filament 108 inserted into air inlet pipe 26 to heat the exhaust air EA as it flows into the muffler chamber 62, as best shown in FIG. 13. A heating wire 110 connects the glowplugs with controller 106. The portion of the heating element 104 inserted into air inlet pipe 26 (i.e., the heating filament 108 of the glowplugs) should be configured so as to not interfere with the flow of the exhaust air EA through the air inlet pipe 26. In one embodiment, the heating filaments 108 are disposed at an angle directed inward towards the muffler 20 and located inside the air inlet pipe 26 slightly downstream of the mating surface 112 where the exhaust pipe 22 abuts against the air inlet pipe 26. As known in the art, the heating filament 108 of glowplugs can reach temperatures of 1,100° F. or more. Preferably, controller 106 is configured with a timer relay switch that alternatively activates and deactivates some of the heating elements 104 so as to not overheat the wires or other components of the vehicle or other device which utilizes the internal combustion engine 12. In the figures, where there are six heating elements 104 utilized, the controller 106 would automatically activate three of the heating elements 104 at one time. In another embodiment, there can be eight heating elements 104, with only four being activated at time. Other variations in the number of heating elements 104 and the number of which are activated at any one time can also be utilized. If desired, the portion of the heating elements 104 extending outside the air inlet pipe 26 can be covered with a heat shield or like device to reduce the potential of heat transfer to other components of the vehicle or persons who may inadvertently come into contact with the exhaust heating mechanism 44.

In an alternative embodiment, the exhaust heating mechanism 44 can be associated with the muffler housing 52 instead of the air inlet pipe 26. In this embodiment, the heating elements 104, such as glowplugs or other devices, can be installed along the sidewall 28 of the muffler 20 such that the heating filament 108 extends through the sidewall 28 and, as applicable, the vortex inducing filter mechanism 64 to the interior of the muffler chamber 62. As with the embodiment described above, the controller 106 could operatively activate one or more of the heating elements 104 to heat the exhaust air EA inside the muffler 20 as it is being subject to the vortex effect by the vortex inducing filter mechanism 64. In another embodiment, the heating elements 104 can be placed along both the air inlet pipe 26 and the sidewall 28 of the muffler housing 52.

As set forth above, cooled return air RA is directed to the air intake device 14 where the pressurized air is directed into the air/fuel mixing device 16 for combustion by engine 12. In one embodiment, the return conduit 42 connects directly to the intake device 14. In the preferred embodiment, however, the return conduit 42 first connects to air valve mechanism 48 that comprises, as shown in FIG. 1, a t-connector 114 which interconnects the return conduit 42 with the secondary air conduit 50. As shown, one side of the t-connector 114 delivers return air RA to the air intake device 14 and the other side of the t-connector 114 connects to the secondary air conduit 50. The opposite end of the secondary air conduit 50 connects to a source of secondary air, shown as SA in FIG. 1, such as ambient air or an alternative supply of cool or cold air (such as a tank of cold air). In the preferred configuration of this embodiment, the air valve mechanism 48 has both an interior valve and a temperature measuring device. The interior valve would either allow the pressurized return air RA to go to the air intake device 14 (the preferred scenario) or it would allow the air intake device 14 to draw in ambient or other air from the source of secondary air SA through the secondary air conduit 50 depending on the temperature of the return air RA. The temperature measuring device portion of the air valve mechanism 48, such as a thermometer or the like, would measure and monitor the temperature of the return air RA from the muffler 20. If the return air RA temperature is too high for beneficial or safe use by the engine 12, then the interior valve would close the return conduit 42, thereby blocking the return air RA from getting to the air intake device 14. When the return air RA is blocked, the air intake device 14 would draw in ambient air (or other air) from the source of secondary air SA through the secondary air conduit 50, thereby protecting the air intake device 14 and engine 12 from too high of temperatures and/or maintaining better engine performance and efficiency, which are usually reduced with use of too high of air from the air intake device 14. In addition, air having too high of a temperature could damage the engine 12. If desired, a pre-filter can be installed in or before the t-connector 114 to catch any particulate matter or other pollutants before they enter the air intake device 14. In one embodiment, the pre-filter can be a screen or screen-like device. As known in the art, a variety of different interior valves, temperature measurement devices and pre-filters can be utilized with the air valve mechanism 48 to achieve the desired operation thereof.

In the preferred embodiment, the vortex exhaust recovery system 10 of the present invention is intended to replace or be used in place of a standard exhaust system associated with internal combustion engine 12. For use with a vehicle, the system 10 of the present invention is configured to attach to the existing components of a vehicle exhaust system with muffler 20 of the present invention being used in place of the vehicle's existing muffler. As such, it is preferred that muffler 20 and the other components of system 10 be sized and configured to replace the engine's standard exhaust system. Preferably, muffler 20 should be configured as a built-in replacement for existing mufflers, thereby only requiring the addition of the return conduit 42 and air valve mechanism 48 to adapt an existing vehicle to one with the benefits of system 10. Once installed, exhaust air EA from engine 12 will flow through exhaust pipes 22 and catalytic converter 24 (as it normally does) and then into air inlet pipe 26 of the improved muffler 20 of the present invention. The exhaust air 24 will be circumferentially directed into the muffler chamber 62 to the helicodially-shaped vortex inducing filter mechanism 64 to generate the cyclone or swirling motion necessary to achieve the vortex effect. The exhaust air EA will be separated into the cooled gas stream CG and hot gas stream HG, with the cooled gas stream CG being directed to the center of the muffler chamber 62 and the hot gas stream HG moving along the outer portion of the muffler chamber 62. Due to the cone member 66, which acts as a nozzle in a Ranque-Hilsch vortex tube, the cooled gas stream CG will be directed forward and out the outlet pipe 40 at the first end 30 of the muffler 20. The hot gas stream HG will be directed around the cone member 66 and out the discharge pipe 34 to tailpipe 36 and then to the atmosphere AT. The filter element 100 of vortex inducing filter mechanism 64 will remove particulate matter and other contaminates from the exhaust air EA and the hot gas stream HG, thereby reducing pollution produced by the engine 12. The cooled gas stream CG will be directed to the air intake device 14, which will direct the pressurized return air RA to the air/fuel mixing device 16 to be utilized by engine 12 for combustion. The cooled, pressurized return air RA will improve the operating performance and fuel efficiency of the engine 12. As such, the vortex exhaust recovery system 10 will both reduce fuel consumption and pollution production for vehicles and other devices having engine 12.

While there are shown and described herein one or more specific embodiments of the invention, it will be readily apparent to those skilled in the art that the invention is not so limited, but is susceptible to various modifications and rearrangements in design and materials without departing from the spirit and scope of the invention. In particular, it should be noted that the present invention is subject to various modifications with regard to any dimensional relationships set forth herein, with regard to its assembly, size, shape and use and with regard to the materials used in its construction. For instance, there are a number of components described herein that can be replaced with equivalent functioning components to accomplish the objectives of the present invention.

What is claimed is:

1. An exhaust recovery system for an internal combustion engine having an air intake device and an air/fuel mixing device, said exhaust recovery system comprising:
 a muffler having a housing with a sidewall, a first end cap at a first end of said muffler and a second end cap at a second end of said muffler, said housing defining a chamber within said muffler;
 an air inlet pipe having a first end pneumatically connected to an exhaust pipe of the internal combustion engine and a second end disposed in said chamber, said air inlet pipe configured to receive exhaust air from the internal combustion engine through the exhaust pipe, said second end of said air inlet pipe configured to circumferentially discharge said exhaust air into said chamber;
 an outlet pipe at said first end cap, said outlet pipe having a pipe body with a first end extending outside of said muffler and a second end extending into said muffler chamber, said first end of said pipe body defining a return outlet, said second end of said pipe body defining a tube inlet;
 a return conduit pneumatically connecting said return outlet of said outlet pipe with the air intake device;
 a discharge pipe at said second end cap, said outlet pipe pneumatically connecting said chamber to the environment;
 a cone member in said chamber, said cone member having a cone tip directed toward said tube inlet of said outlet pipe;
 a vortex inducing filter mechanism disposed in said chamber along an inner wall of said housing and generally around said cone member, said vortex inducing filter mechanism shaped so as to facilitate swirling of said exhaust air in said chamber, said cone member positioned in said chamber so as to separate said exhaust air into a cooled gas stream and a hot gas stream; and
 a filter element disposed in said vortex inducing filter mechanism, said filter element selected to remove particulate matter and/or pollutants from said exhaust air and said hot gas stream,
 wherein said cooled gas stream is directed toward said tube inlet of said outlet pipe and to the air intake device as return air through said return conduit and said hot gas stream is directed around said cone body and out said discharge pipe as hot exhaust air.

2. The exhaust recovery system of claim 1, wherein said outlet pipe is moveably disposed relative to said first end cap so as to selectively vary the distance between said tube inlet and said cone tip.

3. The exhaust recovery system of claim 1, wherein said vortex inducing filter mechanism comprises a porous screen enclosing said filter element in said chamber.

4. The exhaust recovery system of claim 3, wherein said filter element is removably disposed in said screen.

5. The exhaust recovery system of claim 1, wherein said vortex inducing filter mechanism is removably disposed in said chamber.

6. The exhaust recovery system of claim 1 further comprising heating means associated with at least one of said air inlet pipe and said muffler for heating said exhaust air.

7. The exhaust recovery system of claim 6, wherein said heating means comprises one or more heating elements having a heating filament disposed in at least one of said air inlet pipe and said chamber.

8. The exhaust recovery system of claim 7, wherein said heating elements are positioned generally toward said first end of said air inlet pipe.

9. The exhaust recovery system of claim 6 further comprising a controller operatively connected to said heating means to control the operation of said heating means.

10. The exhaust recovery system of claim 1 further comprising an air valve mechanism pneumatically connected to said return conduit and to a secondary air conduit, said secondary air conduit pneumatically connected to a source of secondary air, said air valve mechanism configured to measure the temperature of said return air and selectively direct return air or air from said source of secondary air to the air intake device.

11. An exhaust recovery system for an internal combustion engine having an air intake device and an air/fuel mixing device, said exhaust recovery system comprising:
   a muffler having a housing with a sidewall, a first end cap at a first end of said muffler and a second end cap at a second end of said muffler, said housing defining a chamber within said muffler;
   an air inlet pipe having a first end pneumatically connected to an exhaust pipe of the internal combustion engine and a second end disposed in said chamber, said air inlet pipe configured to receive exhaust air from the internal combustion engine through the exhaust pipe, said second end of said air inlet pipe configured to circumferentially discharge said exhaust air into said chamber;
   an outlet pipe at said first end cap, said outlet pipe having a pipe body with a first end extending outside of said muffler and a second end extending into said muffler chamber, said first end of said pipe body defining a return outlet, said second end of said pipe body defining a tube inlet;
   a return conduit pneumatically connecting said return outlet of said outlet pipe with the air intake device;
   a discharge pipe at said second end cap, said outlet pipe pneumatically connecting said chamber to the environment; and
   vortex means disposed in said chamber for filtering said exhaust air to remove particulate matter and/or pollutants and separating said exhaust air into a cooled gas stream and a hot gas stream, said vortex means shaped so as to facilitate swirling of said exhaust air in said chamber, said cooled gas stream directed toward said tube inlet of said outlet pipe and to the air intake device as return air through said return conduit, said hot gas stream directed around said cone body and out said discharge pipe as hot exhaust air.

12. The exhaust recovery system of claim 11, wherein said vortex means comprises a cone member disposed in said chamber and a filter element generally disposed along an inner wall of said chamber, said cone member having a cone tip directed toward said tube inlet of said outlet pipe, said filter element selected to remove the particulate matter and/or pollutants from said exhaust air and said hot gas stream.

13. The exhaust recovery system of claim 11, wherein said filter element is removably disposed in said vortex means.

14. The exhaust recovery system of claim 11, wherein said vortex means is removably disposed in said chamber.

15. The exhaust recovery system of claim 11 further comprising heating means associated with at least one of said air inlet pipe and said muffler for heating said exhaust air.

16. The exhaust recovery system of claim 15 further comprising a controller operatively connected to said heating means to control the operation of said heating means.

17. The exhaust recovery system of claim 11 further comprising an air valve mechanism pneumatically connected to said return conduit and to a secondary air conduit, said secondary air conduit pneumatically connected to a source of secondary air, said air valve mechanism configured to measure the temperature of said return air and selectively direct return air or air from said source of secondary air to the air intake device.

18. A muffler for use in an exhaust recovery system with an internal combustion engine having an air intake device and an air/fuel mixing device, said muffler comprising:
   a housing with a sidewall, a first end cap at a first end of said muffler and a second end cap at a second end of said muffler, said housing defining a chamber within said muffler;
   an air inlet pipe having a first end configured to be pneumatically connected to an exhaust pipe of the internal combustion engine and a second end disposed in said chamber, said air inlet pipe configured to receive exhaust air from the internal combustion engine through the exhaust pipe, said second end of said air inlet pipe configured to circumferentially discharge said exhaust air into said chamber;
   an outlet pipe at said first end cap, said outlet pipe having a pipe body with a first end extending outside of said muffler and a second end extending into said muffler chamber, said first end of said pipe body defining a return outlet configured to connect to a return conduit pneumatically connected to the air intake device, said second end of said pipe body defining a tube inlet;
   a discharge pipe at said second end cap, said outlet pipe configured to pneumatically interconnect said chamber and the environment;
   a cone member disposed in said chamber, said cone member having a cone tip directed toward said tube inlet of said outlet pipe;
   a vortex inducing filter mechanism disposed in said chamber along an inner wall of said housing and generally around said cone member, said vortex inducing filter mechanism shaped so as to facilitate swirling of said exhaust air in said chamber, said cone member positioned in said chamber so as to separate said exhaust air into a cooled gas stream and a hot gas stream; and
   a filter element disposed in said vortex inducing filter mechanism, said filter element selected to remove particulate matter and/or pollutants from said exhaust air and said hot gas stream,
   wherein said cooled gas stream is directed into said outlet pipe through said tube inlet and said hot gas stream is directed around said cone body and out said discharge pipe.

19. The muffler of claim 18 further comprising heating means associated with at least one of said air inlet pipe and said muffler for heating said exhaust air.

20. The muffler of claim 18 further comprising an air valve mechanism pneumatically connected to said outlet pipe and to a secondary air conduit, said secondary air conduit pneumatically connected to a source of secondary air, said air valve mechanism configured to measure the temperature of said return air and selectively direct return air or air from said source of secondary air to the air intake device.

* * * * *